(12) United States Patent
Chen (10) Patent No.: US 12,101,827 B1
(45) Date of Patent: Sep. 24, 2024

(54) BACKOFF COUNTING METHOD IN A NON-SIMULTANEOUS TRANSMIT AND RECEIVE (NSTR) OPERATION MODE

(71) Applicant: TP-LINK CORPORATION PTE. LTD., Singapore (SG)

(72) Inventor: Junbin Chen, Shenzhen (CN)

(73) Assignee: TP-LINK CORPORATION PTE. LTD., Singapore (SG)

(*) Notice: Subject to any disclaimer, the term of this patent is extended or adjusted under 35 U.S.C. 154(b) by 0 days.

(21) Appl. No.: 18/410,638

(22) Filed: Jan. 11, 2024

Related U.S. Application Data (63) Continuation of application No. 18/238,429, filed on Aug. 25, 2023.

(51) Int. Cl.
  *H04W 74/0833* (2024.01)
  *H04W 74/08* (2009.01)
  *H04W 74/0816* (2024.01)

(52) U.S. Cl.
  CPC ..... *H04W 74/085* (2013.01); *H04W 74/0816* (2013.01); *H04W 74/0891* (2013.01)

(58) Field of Classification Search
  CPC ........... H04W 74/085; H04W 74/0816; H04W 74/0891
  See application file for complete search history.

(56) References Cited

U.S. PATENT DOCUMENTS

| | | | |
|---|---|---|---|
| 2017/0188336 A1* | 6/2017 | Ahn | H04W 74/0858 |
| 2017/0338935 A1* | 11/2017 | Ahn | H04W 72/0446 |
| 2018/0199380 A1* | 7/2018 | Itagaki | H04W 74/0825 |
| 2020/0404680 A1* | 12/2020 | Chu | H04W 72/0446 |
| 2021/0321450 A1* | 10/2021 | Cariou | H04W 74/002 |
| 2022/0150958 A1* | 5/2022 | Chu | H04W 74/0866 |
| 2022/0312506 A1 | 9/2022 | Xia | |
| 2023/0300903 A1* | 9/2023 | Kim | H04L 69/324 |
| | | | 370/329 |

FOREIGN PATENT DOCUMENTS

| | | |
|---|---|---|
| CN | 115988674 A | 4/2023 |
| WO | 2023056652 A1 | 4/2023 |

OTHER PUBLICATIONS

IEEE P802.11 Wireless LANs, May 2021, 802.11-20/0514r10, 15 pages.

* cited by examiner

*Primary Examiner* — Ajay Cattungal
(74) *Attorney, Agent, or Firm* — Loeb & Loeb LLP (57) ABSTRACT

This disclosure provides a backoff counting method in a non-simultaneous transmit and receive (NSTR) operation mode and the communication device for the method. The method includes: configuring a plurality of backoff counters for counting backoff slots with no medium activity of channels of the plurality of links; synchronizing a count value of a first backoff counter of the plurality of backoff counters with a count value of a second backoff counter of the plurality of backoff counters, if the first backoff counter starts counting later than the second backoff counter or resumes counting after a pause, wherein the count value of the second backoff counter is smaller than that of the first backoff counter; and transmitting or receiving a signal on a channel of at least one of the plurality of links after all the backoff counters reach a predefined value.

20 Claims, 9 Drawing Sheets

BACKOFF COUNTING METHOD IN A NON-SIMULTANEOUS TRANSMIT AND RECEIVE (NSTR) OPERATION MODE

CROSS REFERENCE TO RELATED APPLICATIONS

This application is a continuation of U.S. Non-Provisional patent application Ser. No. 18/238,429, filed on Aug. 25, 2023 and titled "BACKOFF COUNTING METHOD IN A NON-SIMULTANEOUS TRANSMIT AND RECEIVE (NSTR) OPERATION MODE". The entire disclosure of the aforementioned application is incorporated by reference as part of the disclosure of this application.

TECHNICAL FIELD

The present disclosure relates to wireless communication, in particular to a backoff counting method in the NSTR operation mode and the communication device thereof.

BACKGROUND

In the standardization of next generation wireless local area network (WLAN), a multi-link device (MLD) architecture is introduced, which allows a plurality of links to be established between an access point (AP) multi-link device (AP MLD) and a non-AP MLD (e.g., a STA). Data can be transmitted or received on the plurality of links simultaneously. Further, the non-simultaneous transmit and receive (NSTR) operation mode is proposed to reduce transmission radio frequency interferences between links, considering that the operation frequency interval of some MLD links is insufficient. In this mode, the APs (or STAs) under MLD are not allowed to receive and transmit data simultaneously. That is, all links are only receiving data or transmitting data at a time.

SUMMARY

Based on the above, the present disclosure provides a backoff counting method in a NSTR operation mode, a communication device for backoff counting in the NSTR operation mode and a related computer-readable storage medium.

In an aspect of the present disclosure, the present disclosure provides a backoff counting method in a NSTR operation mode implemented in a first communication device, the first communication device being configured with a plurality of links for communicating with second communication device, the method comprising: configuring a plurality of backoff counters for counting backoff slots with no medium activity of channels of the plurality of links; synchronizing a count value of a first backoff counter of the plurality of backoff counters with a count value of a second backoff counter of the plurality of backoff counters, if the first backoff counter starts counting later than the second backoff counter or resumes counting after a pause, wherein the count value of the second backoff counter is smaller than that of the first backoff counter; and transmitting or receiving a signal on a channel of at least one of the plurality of links after all the backoff counters reach a predefined value.

In another aspect of the present disclosure, the present disclosure provides a first communication device for backoff counting in a NSTR operation mode, the first communication device being configured with a plurality of links for communicating with a second communication device, the first communication device comprising: a circuit, configured to: configure a plurality of backoff counters for counting backoff slots with no medium activity of channels of the plurality of links; synchronize a count value of a first backoff counter of the plurality of backoff counters with a count value of a second backoff counter of the plurality of backoff counters, if the first backoff counter starts counting later than the second backoff counter or resumes counting after a pause, wherein the count value of the second backoff counter is smaller than that of the first backoff counter; and a transceiver, configured to: transmit or receive a signal on a channel of at least one of the plurality of links after all the backoff counters reach a predefined value.

In yet another aspect of the present disclosure, the present disclosure provides a backoff counting method in a NSTR operation mode implemented in a first communication device, the first communication device being configured with a plurality of links for communicating with a second communication device, the method comprising: configuring one single backoff counter for counting backoff slots with no medium activity of channels for the plurality of links; decreasing a count value of the backoff counter if no medium activity of a channel of one of the plurality of links is indicated for a duration of a backoff slot; transmitting or receiving a signal on a channel of at least one of the plurality of links after the backoff counter reaches a predefined value and the plurality of links are clear.

In yet another aspect of the present disclosure, the present disclosure provides a communication apparatus comprising means for processes of the backoff counting method in the NSTR operation mode according to embodiments of the present disclosure.

In yet another aspect of the present disclosure, the present disclosure provides a computer-readable storage medium storing instruction thereon which, when being executed by a processor, implements the backoff counting method in the NSTR operation mode according to embodiments of the present disclosure.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements. In the accompanying drawings.

DETAILED DESCRIPTION

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occurs therebetween.

In the following paragraphs, certain exemplifying embodiments are explained with reference to the AP MLD and the non AP MLD (e.g., STA MLD) in WLAN.

In the present disclosure, an AP, which may be interchangeably referred to as a wireless access point (WAP), is a communication device that can communicate with a non AP (e.g., STA) in a WLAN via a plurality of links and that allows the non AP to connect to a wired network. The AP usually connects to a router (via a wired network) as a standalone device, but it can also be integrated with or employed in the router.

Likewise, in the present disclosure, a non AP (e.g., a station, which is interchangeably referred to as a STA) is a communication device that can communicate with an AP via a plurality of links. The STA can be any device that contains an IEEE 802.11-conformant media access control (MAC) and physical layer (PHY) interface to the wireless medium (WM). For example, a STA may be a laptop, a desktop personal computer (PC), a personal digital assistant (PDA), an access point or a Wi-Fi phone in a WLAN environment. The STA may be fixed or mobile. In the WLAN environment, the terms "STA", "wireless client", "user", "user device", and "node" are often used interchangeably.

In the present disclosure, a STA in a WLAN may work as an AP at a different occasion, and vice versa. This is because communication devices in the context of IEEE 802.11 (Wi-Fi) technologies may include both STA hardware components and AP hardware components. In this manner, the communication devices may switch between a STA mode and an AP mode, based on actual WLAN conditions and/or requirements. In various embodiments below, a non-AP STA may refer to a STA in a WLAN that is not implemented as an AP.

Figure 1:
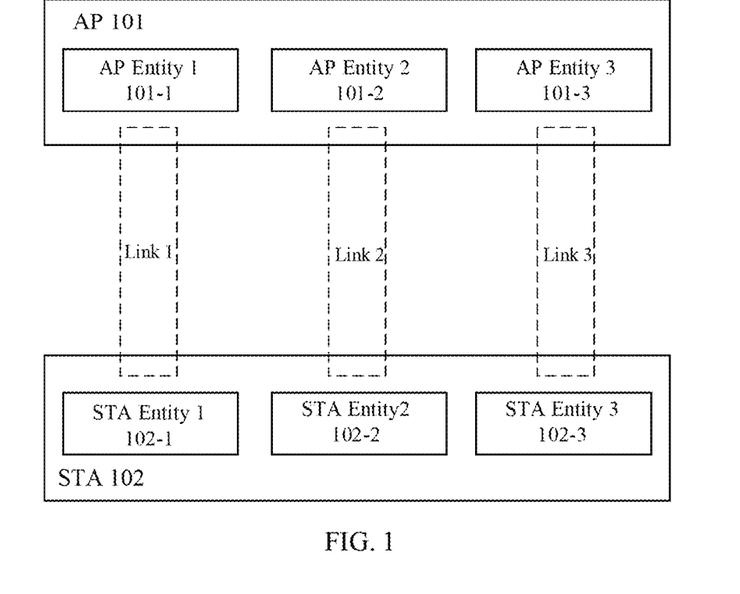
FIG. 1 shows an exemplary MLD architecture according to an embodiment of the present disclosure.

FIG. 1 shows the exemplary MLD architecture according to an embodiment of the present disclosure. In the present disclosure, as shown in FIG. 1, the MLD architecture can allow three links (i.e., link1 between AP entity 1 101-1 and STA entity 1 102-1, link 2 between AP entity 2 101-2 and STA entity 2 102-2 and link 3 between AP entity 3 101-3 and STA entity 3 102-3) of different frequency bands to be established between an AP 101 and a STA 102. Data can be transmitted or received on the three links simultaneously. In an embodiment, the three links can be established in different frequency bands by different chips, for example 2.4 Ghz, 5 Ghz and 6 Ghz frequency bands. In another embodiment, the three links can be established in the same frequency band by one chip. For example, links 1-3 in FIG. 1 can be operated in any one of 2.4 Ghz, 5 Ghz and 6 Ghz frequency bands. In the disclosure, the AP entity and the STA entity refer to means (e.g., a circuit and/or software) in the AP and STA that is used to establish the link and operates on this link. Note, it should be understood that 2.4 Ghz, 5 Ghz and 6 Ghz frequency bands listed above are merely examples of the frequency bands in which the links can be established and operated, but not a limitation. That is, links can be established and operated, by AP or STA in other frequency bands in addition to 2.4 Ghz, 5 Ghz and 6 Ghz frequency bands.

As stated above, the NSTR operation mode is proposed to reduce the transmission radio frequency interference between links under the MLD architecture, considering that the operation frequency interval of some of the links is insufficient. In this mode, the AP entities (or STA entities) under MLD are not allowed to receive data and transmit data simultaneously. That is, all links (i.e., NSTR links) are only receiving data or transmitting data at a time. Note, it should be understood that it is not necessary that all links under the MLD architecture are operated in NSTR operation mode. For example, in an embodiment, all three links in FIG. 1 can be operated in the NSTR operation mode, since the operation frequency interval among the three links is not insufficient. In another embodiment, link 1 and link 2 can be operated in the NSTR operation mode, but link 3 is not operated in NSTR operation mode, since the operation frequency internal between link 1 and link 2 is insufficient but the operation frequency internal between (link 1, link 2) and link 3 is large enough to avoid transmission radio frequency interference. In addition, it also should be understood that more or less than three links can be established between an AP and a STA, although three links are shown in FIG. 1.

In the NSTR operation mode, the MLD (e.g., the AP entities and the STA entities under the MLD) must align the start timing of the transmission or reception of data on the plurality of links, since it is necessary to transmit the data or receive the data simultaneously. In this case, the current protocol provides the following relevant provisions on the channel contention mechanism.

A STA affiliated with an MLD operating on a link that is part of an NSTR link pair for that MLD shall follow the channel access procedure described below:
1) The STA may initiate transmission on a link when the medium is idle as indicated by the physical and virtual CS mechanism and one of the following conditions is met:
   a) The STA obtained an EDCA TXOP following the procedure in 10.23.2.4 (Obtaining an EDCA TXOP).
   b) The backoff counter of the STA is already zero, and the STA operating on the other link of NSTR link pair of the affiliated MLD obtains an EDCA TXOP following the procedure in 10.23.2.4 (Obtaining an EDCA TXOP).
2) When the backoff counter of the STA reaches zero, it may choose to not transmit and keep its backoff counter at zero. A STA with backoff counter that has already reached zero may initiate transmission only following condition 1b).
3) A STA with backoff counter that has already reached zero and that chose not to transmit following condition 1b) may perform a new backoff procedure following deferral as described in 10.23.2.4 (Obtaining an EDCA TXOP) and 10.3.4.3 (Backoff procedure for DCF) before being allowed to initiate transmission on a link following condition 1a). In such a case, CW[AC] (Access Category) and QSRC[AC] are left unchanged.

In the current EDCA (Enhanced Distributed Channel Access) mechanism, the waiting time (e.g., arbitration inter-frame space (AIFS)) before contention for a certain AC packet is: AIFS[AC]=AIFSN[AC]×aSlotTime+aSIFSTime If the channel remains clear during the AIFS, the data corresponding to the AC initiates a contention on the link.

When the contention is initiated, a number is randomly selected from [CWmin, CWmax] as the initial counter value of the backoff counter configured for the data corresponding to the AC, and then the backoff counting is started. When the backoff counter reaches 0, the data corresponding to the AC obtains this transmission opportunity (TXOP) through the contention and can start data transmission. If the channel is detected to be busy (e.g., by clear channel assessment (CCA)) during the counting, the counting will be paused until the channel is clear again.

According to the above, it is understood that each link of NSTR links follows the channel access mechanism of independent distributed coordination function (DCF) and EDCA contention. Specifically, for MLD in the NSTR operation mode, all links are allowed to transmit or receive a signal (e.g., data) only when backoff counters of all the links reach zero. This channel access mechanism may increase the backoff waiting time of the links and lead to higher packet delay.

In particular, for example, when different links are scheduled for data, initial counter values of backoff counters of these links may be quite different. In this case, there may be a case that the backoff counter of one link reached zero and then obtained a TXOP through contention, but it needs to wait for a long time until the backoff counters of other links reach zero before transmitting the data.

Figure 2:
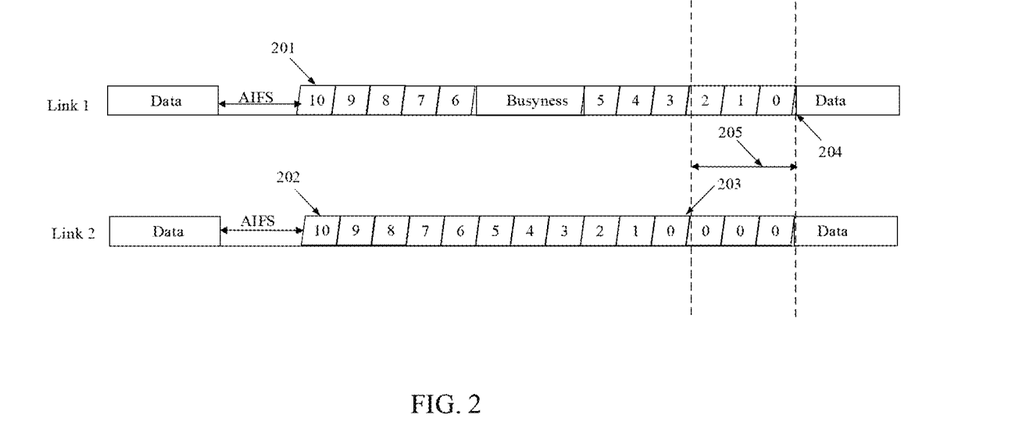
FIG. 2 is a schematic diagram for illustrating the backoff counting method in the prior art.

In addition, when the busyness of channels of a plurality of links is inconsistent, even if backoff counters of these links have the same initial counter value, there may still be big differences in the backoff counting procedures of these links, resulting in a long backoff waiting time. For example, as shown in FIG. 2, link 2 whose backoff counter 202 reaches zero at timing 203 has to wait for a long time (i.e., the backoff waiting time 205) until link 1 completes its backoff counting procedure at timing 204, before transiting or receiving a signal on the link.

Based on the above, the present disclosure provides a backoff counting method in the NSTR operation mode and the communication device thereof. This provided backoff counting method can reduce or eliminate the backoff waiting time between NSTR links resulted from the busyness of channels of the links being inconsistent, thereby facilitating the efficiency of the channel contention. In the present disclosure, the busyness of channels of the links is mainly resulted from the following two types of interferences.
1) A channel of a link of a communication device (e.g., an AP) is detected to be busy, since another communication device which is operated on the same frequency as that of the communication device has obtained the corresponding channel through contention and is transmitting a signal on the corresponding channel. In this case, this link of the communication device has to pause its counting. However, other links of the communication device which are not operated on the same frequency do not need to pause their counting.

For example, as shown in FIG. 1, there are three AP entities {AP entity 1 101-1, AP entity 2 101-2, AP entity 3 101-3} affiliated with AP 101 and accordingly three links (link 1, link 2, link 3) are established. Assuming that the link 1 of AP entity 1 101-1 operates on the same channel as AP entity 4 under another AP (for example, AP 2, not shown), when AP4 occupies the same channel to transmit a signal, AP entity 1 needs to pause its counting and wait for the channel to be clear again, but AP entity 2 and AP entity 3 do not need to pause their counting since their channels do not operate on the same channel as AP entity 4.

2) The plurality of links can comprise multiple link pairs. In this disclosure, if a transmission on a channel of a link of the plurality of links causes a channel of another link of the plurality of links to be detected to be busy, the link and the another link belong to a link pair, which may be called a NSTR link pair for example. This interference can be referred as "in-device coexistence (IDC) interference". In this case, all links belonging to the same link pair as the link which is transmitting a signal have to pause their counting, but other links not belonging to the same link pair as the link which is transmitting the signal do not need to pause their counting.

For example, as shown in FIG. 1, there are three APs {AP entity 1 101-1, AP entity 2 101-2, AP entity 3 101-3} affiliated with AP 101 and accordingly three links (link 1, link 2, link 2) are established. Assuming link 1 and link 2 belong to a first link pair, link 2 and link 3 belong to a second link pair, and link 1 and link 3 do not belong to the same link pair, when AP entity 1 101-1 is transmitting on the channel of link 1, link 2 will be detected to be busy and pauses its counting since link 1 and link 2 belong to the same link pair. Whereas, link 3 does not need to pause its counting since link 1 and link 3 do not belong to the same link pair. Note, it should be understood that there can be more than two links in a link pair. For example, it is possible that link 1, link 2 and link 3 in FIG. 1 belong to one link pair. Further, it should be understood that the backoff counting method provided in the present disclosure can apply to busyness resulted from other types of interferences in addition to the above two types of interferences.

Figure 3:
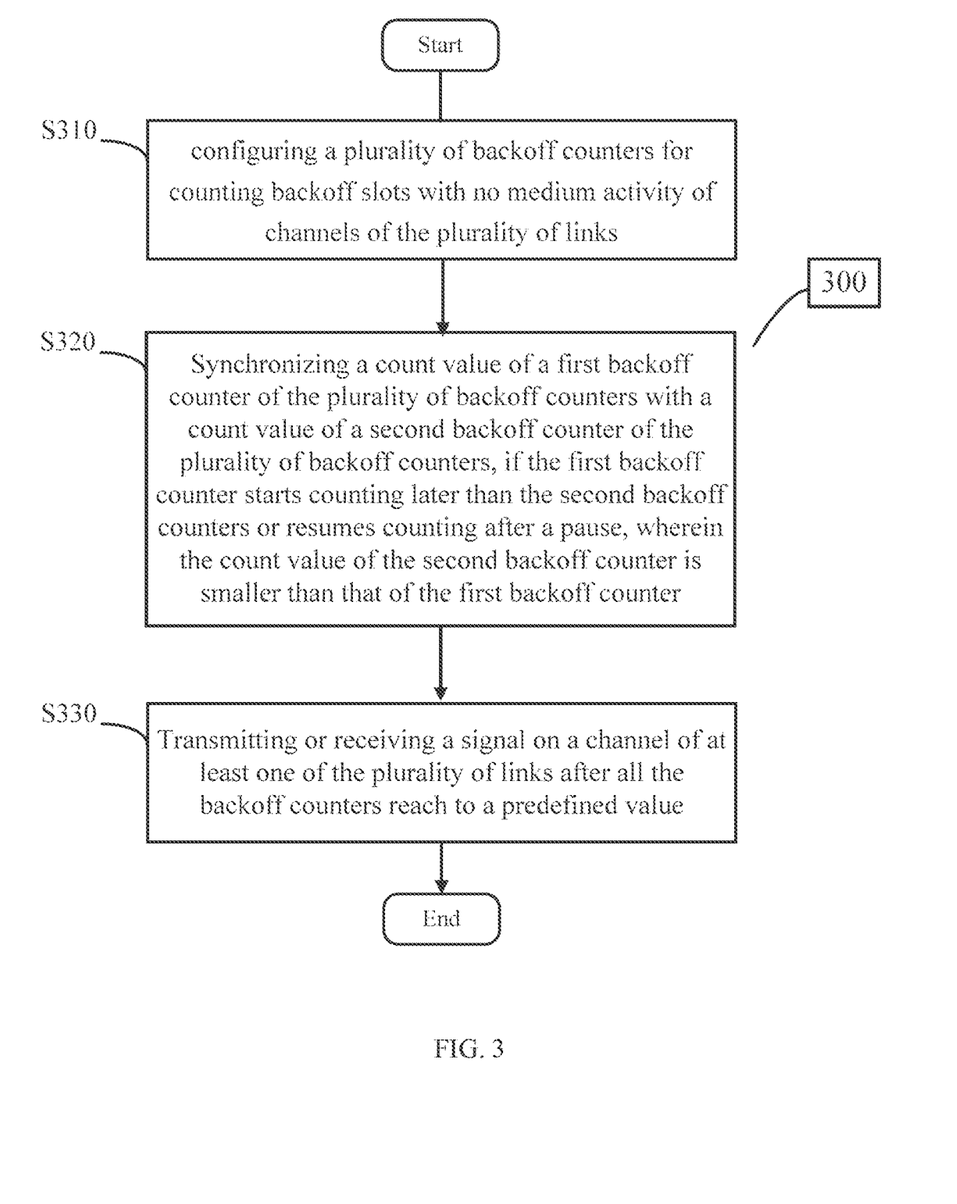
FIG. 3 shows a backoff counting method in the NSTR operation mode according to an embodiment of the present disclosure.

FIG. 3 shows a backoff counting method 300 in the NSTR operation mode according to an embodiment of the present disclosure. The backoff counting method can be implemented in a communication device (i.e., a first communication device). The communication device can be configured with a plurality of links for communicating with another communication device (i.e., a second communication device). In an embodiment, the communication device can be an AP and the another communication device can be a STA. Alternatively, the communication device can be the STA and the another communication device can be the AP. Yet alternatively, the communication device can be the AP and the another communication device can also be the AP. Yet alternatively, the communication device can be the STA and the another communication device can also be the STA. As an example, the plurality of links can be three links, operated in any one of 2.4 Ghz, 5 Ghz and 6 Ghz frequency bands.

As shown in FIG. 3, the backoff counting method 300 starts at block 310. At block 310, a plurality of backoff counters can be configured for counting backoff slots with no medium activity of channels of the plurality of links. Then, at block 320, a count value of a first backoff counter of the plurality of backoff counters can be synchronized with a count value of a second backoff counter of the plurality of backoff counters, if the first backoff counter starts counting later than the second backoff counter or resumes counting after a pause, wherein the count value of the second backoff counter is smaller than that of the first backoff counter. Then, the backoff counting of the first backoff counter can be based on the synchronized counter value. In this way, if the first backoff counter starts counting later than the second backoff counter, when it starts counting, it does not use the predetermined initial count value, but directly refers to the current count value of the second backoff counter, thereby shortening the backoff counting time of the first backoff counter reaching a predefined value. Accordingly, the backoff waiting time of the second backoff counter is reduced. Similarly, if the first backoff counter resumes counting after a pause, it can also directly refer to the current count value of the second backoff counter, thereby shortening the backoff counting time of the first backoff counter reaching the predefined value. After all the backoff counters reach the predefined value, a signal (e.g., data) can be transmitted or received on a channel of at least one of the plurality of links at block 330. In an embodiment, the predefined value can be zero. Of course, the predefined value can be other integer values (such as one). Transmitting or receiving the signal after all the backoff counters reach the predefined value is well known in the art, and the detailed description thereof is omitted for the brevity.

Figure 4:
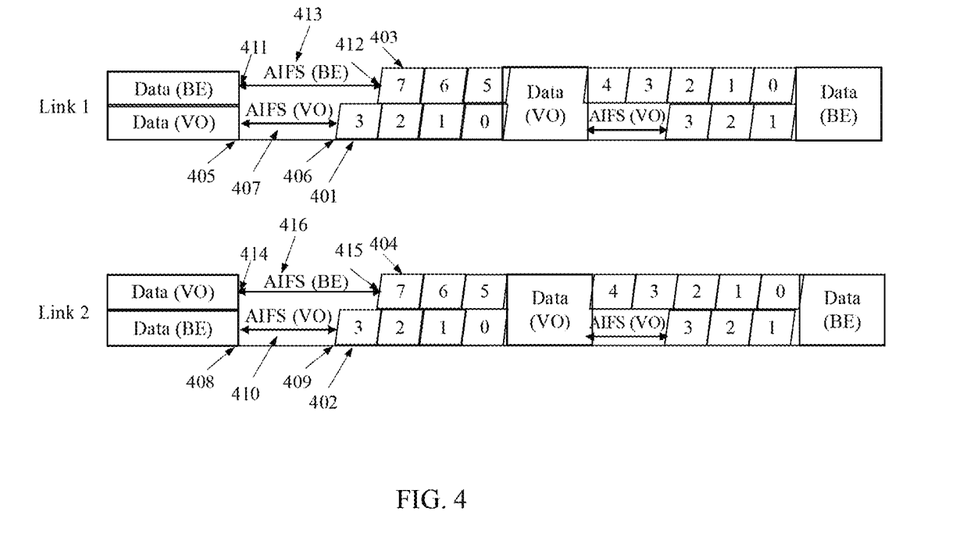
FIG. 4 is a schematic diagram for illustrating an exemplary scenario in which the backoff counting method in the NSTR operation mode according to the embodiment of the present disclosure is applied.
Figure 5:
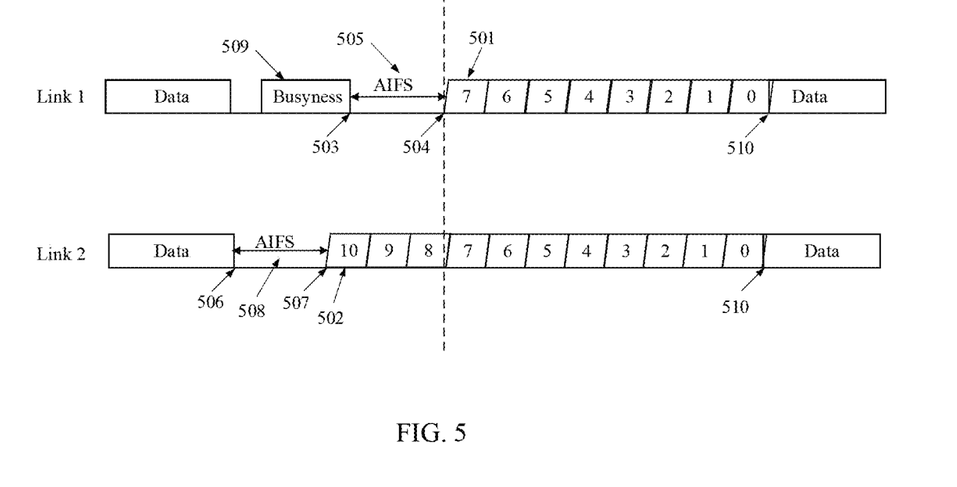
FIG. 5 is a schematic diagram for illustrating an exemplary scenario in which the backoff counting method in the NSTR operation mode according to the embodiment of the present disclosure is applied.

Additionally, the initial count values of the plurality of backoff counters can be the same in a case that the plurality of backoff counters start counting simultaneously, as shown in FIG. 4. Similarly, the plurality of links can be configured with the same waiting time (i.e., AIFS) from a specific timing until they start counting. As an example, the specific timing can be the timing at which the link completes a last transmission or reception, or the timing at which the busyness of the link ended. For example, AIFS 407 and AIFS 410 in FIG. 4 are the same and AIFS 505 and AIFS 508 in FIG. 5 are the same. Additionally, in an embodiment, multiple data scheduled to be transmitted or received can correspond to multiple different QoS types (e.g., VO (voice) and BE (best-effort) shown in FIG. 4, etc.) and contend a transmission opportunity (TXOP) simultaneously. In this case, multiple, a plurality of backoff counters can be configured for the multiple data of different QoS types, respectively. That is, the plurality of backoff counters can be configured for each of the multiple data, and backoff procedures of the plurality of backoff counters corresponding to the multiple data are independent of each other. For example, the multiple, a plurality of backoff counters can be associated with different AIFSs and initial counter values. Exemplarily, the higher priority of the QoS type, the smaller the AIFS and the initial counter value. For example, as shown in FIG. 4, data of two types of QoS, data (VO) and data (BE) is scheduled. In this example, a first plurality of backoff counters, backoff counter 401 and 402 are configured for data (VO) and a second plurality of backoff counters, backoff counter 403 and 404 are configured for data (BE). The backoff counter 401 and 402 can be associated with smaller AIFS and initial counter value compared to the backoff counter 403 and 404, since the priority of the VO is higher than that of BE.

In this disclosure, synchronizing the count value of the first backoff counter with the count value of the second backoff counter can be understood that the count value of the first backoff counter is set based on the count value of the second backoff counter. For example, in an embodiment, the count value of the first backoff counter can be set equal equal to the count value of the second backoff counter.

In the following, exemplary scenarios in which the backoff counting method in the NSTR operation mode according to the embodiment of the present disclosure is applied will be described with reference to FIGS. 5-9. In the present disclosure, FIGS. 5-8 can direct to the first type of interference as described above and FIG. 9 can direct to the second type of interference (i.e., IDC interference) as described above.

In FIG. 5, the backoff counter 501 of link 1 starts counting later than the backoff counter 502 due to busyness 509 of link 1. In this case, when the backoff counter 501 starts counting at timing 504, it can set its counter value equal to the counter value 7 of the backoff counter 502, instead of the initial counter value 10. Then, the backoff counting procedure of the link 1 can be based on the the counter value 7. In this manner, link 1 and link 2 can both reach the predefined value (i.e., zero) at timing 510, and link 2 does not need to wait for the backoff counting of link 1 as shown in FIG. 2.

Figure 6:
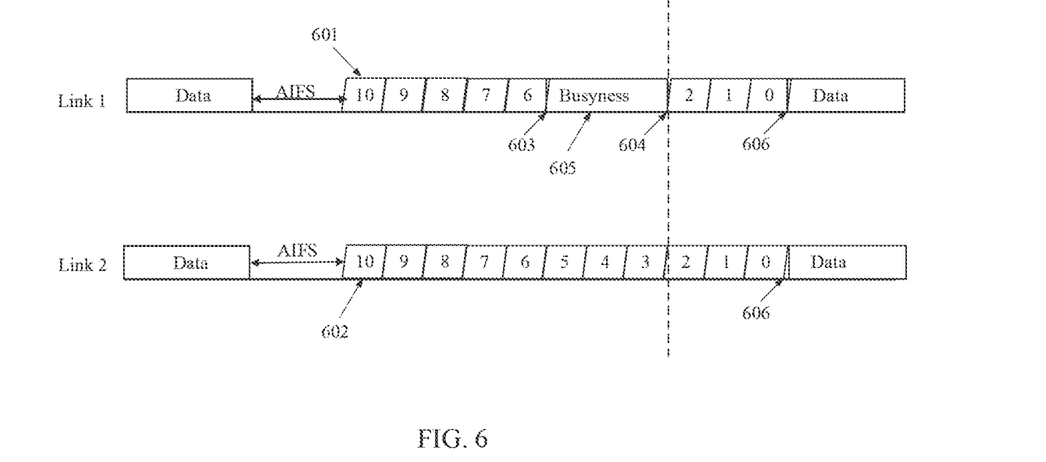
FIG. 6 is a schematic diagram for illustrating an exemplary scenario in which the backoff counting method in the NSTR operation mode according to the embodiment of the present disclosure is applied.

In FIG. 6, the backoff counter 601 of link 1 pauses its counting at timing 603 due to busyness 605 of link 1, and the backoff counter 602 of link 2 keeps counting without a pause. When the backoff counter 601 resumes counting at timing 604, its counter value can be set equal to the counter value 2 of the backoff counter 602. Then, the backoff counting procedure of link 1 can be based on the the counter value 2. In this manner, link 1 and link 2 both reach the predefined value (i.e., zero) at timing 606, and link 2 does not need to wait for the backoff counting of link 1 as shown in FIG. 2.

Figure 7:
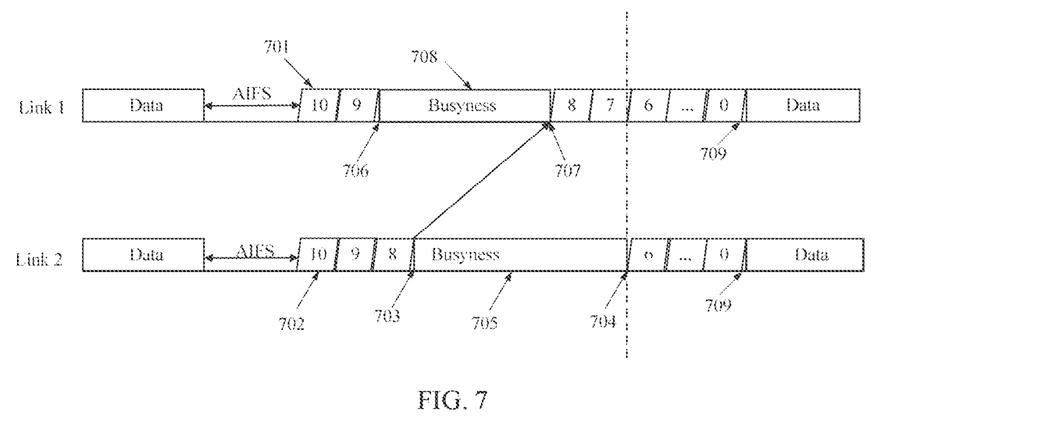
FIG. 7 is a schematic diagram for illustrating an exemplary scenario in which the backoff counting method in the NSTR operation mode according to the embodiment of the present disclosure is applied.

In FIG. 7, the backoff counter 701 of link 1 pauses its counting at timing 706 due to busyness 708 and the backoff counter 702 of link 2 keeps counting till timing 703. At the timing 703, the backoff counter 702 of link 2 pauses its counting due to busyness 705 during the pause of the backoff counter 701. In this case, a counter value 8 of the backoff counter 702 is recorded. When the backoff counter 701 resumes counting at timing 707 after the link 1 finishes the busy mode, and the pause of the backoff counter 702 does not end at that time, the counter value of the backoff counter 701 can be set equal to the counter value 8 with reference to the recorded counter value 8 of the backoff counter 702. Then, the backoff counting procedure of link 1 can be based on the the counter value 8. Thereafter, when the backoff counter 702 resumes counting at timing 704, its counter value can be set equal to the counter value 6 of the backoff counter 701, similar to FIG. 6. In this manner, link 1 and link 2 both reach the predefined value (i.e., zero) at timing 709, even if the link 1 and link 2 suffer from different busyness.

Figure 8:
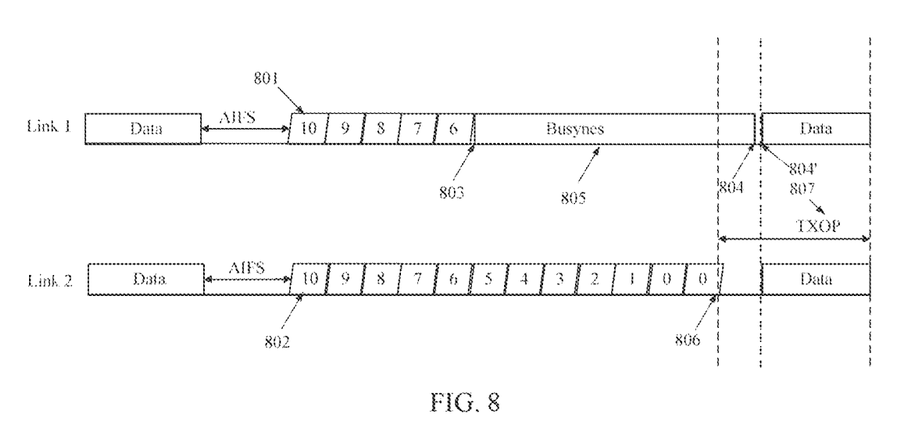
FIG. 8 is a schematic diagram for illustrating an exemplary scenario in which the backoff counting method in the NSTR operation mode according to the embodiment of the present disclosure is applied.

In FIG. 8, the backoff counter 801 of link 1 pauses its counting at timing 803 due to busyness 805 and the backoff counter 802 of link 2 keeps counting without a pause. In the example in FIG. 8, the backoff counter 802 reaches and remains 0, and the link 2 obtains a transmission opportunity (TXOP) 807 by contention while the link 1 is still busy (i.e., busyness 805). In this case, the busyness 805 is ended at timing 804 and the link 1 is detected to be idle at timing 804'. The counter value of the backoff counter 801 can be set equal to zero at the timing 804' and data can be transmitted in the TXOP 807 synchronously.

Figure 9:
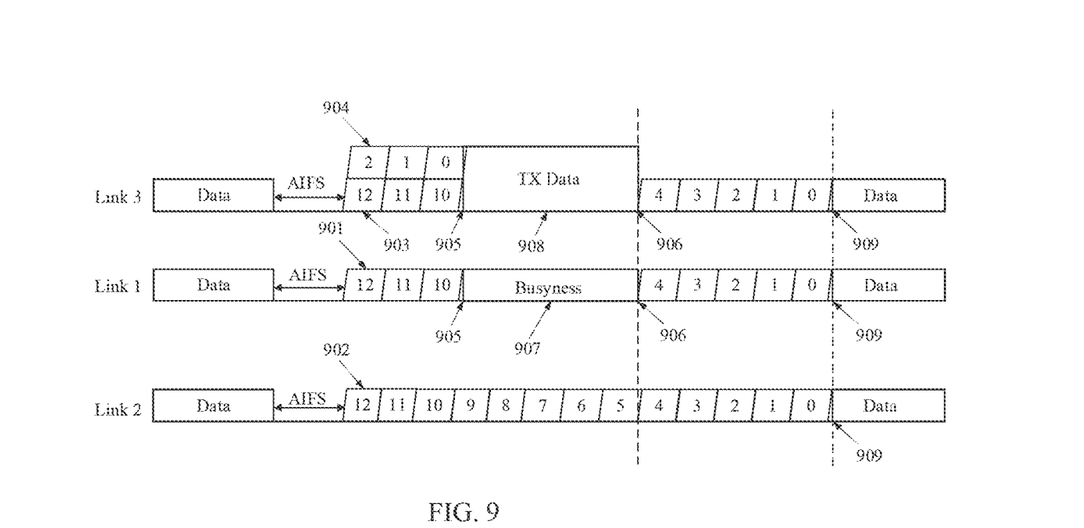
FIG. 9 a schematic diagram for illustrating an exemplary scenario in which the backoff counting method in the NSTR operation mode according to the embodiment of the present disclosure is applied.

In FIG. 9, it is assumed that link 1 and link 3 belong to a link pair, and link 2 and link 3 does not belongs to the same link pair. In FIG. 9, link 3 transmits data to another non-MLD device during a time period 908. In this case, the backoff counter 903 pauses its counting since link 3 is transmitting the data, and the backoff counter 901 of link 1 pauses its counting due to the transmission of link 3, i.e., busyness 907 resulted from the IDC interference between link 1 and link 3. Whereas, the backoff counter 902 of link 2 does not pauses its counting since it does not belong to the same pair as link 3, and thus has no interference with link 3. Thereafter, when the backoff counters 901 and 903 resumes counting at timing 906, their counter values can be set equal to the counter value 4 of the backoff counter 902. Then, the backoff counting procedures of link 1 and link 3 can be based on the counter value 4. In this manner, links 1-3 can reach the predefined value (i.e., zero) at timing 609 synchronously.

As can be seen from above, in the backoff counting method in the NSTR operation mode described with reference to the FIGS. 3-9, backoff counters of a plurality of links can count independently. In particular, a backoff counter of a link of the plurality of links pause its counting due to the busyness of the channel of the link, while backoff counters of other links of the plurality of links can keep counting. In addition, the backoff counting method can expedite the backoff counting procedure of the backoff counter which starts counting later than other backoff counters or pauses its counting, thereby reducing or eliminating the backoff waiting time among the plurality of links due to the busyness of channels of the links being inconsistent, so as to facilitate the efficiency of the channel contention.

It should be understood that the provided backoff counting method in the NSTR operation mode in this disclosure can be applied to more than two backoff counters (e.g., three or more backoff counters), although the above FIG. 4-8 are described with reference to two backoff counters. Further, it also should be understood that the signal (e.g., data) can transmitted or received on channels of any one or more links of the plurality of links as per scheduling, although the signal is transmitted on channels of both link 1 and link 2 in FIGS. 4-8

Alternatively, in another embodiments, the count value of the first backoff counter can be set to a counter value determined based on the count value of the second backoff counter, instead of setting equal equal to the count value of the second backoff counter directly. For example, the count value of the first backoff counter can be set equal to the maximum between the count value of the second backoff counter and a specific counter value which is bigger than the predefined value. In the present disclosure, the specific counter value can be a predetermined minimum counter value and is an integer, for example 1 or 2 in a case that the predefined value is zero. By this manner, a busy link is falsely detected as clear can be avoid. Specifically, for example, in the case of FIG. 8, the busyness 805 is ended at the timing 804 and the channel of the link 1 is detected to be clear at the timing 804'. At the timing 804', the counter value of the link 1 is set to equal to 0 and the channel of the link 1 is deemed as clear. However, there may be a possibility that the channel of the link 1 is busy but falsely detected as clear at the timing 804'. By setting the counter value of the backoff counter 801 of the link 1 equal to predetermined minimum counter value (e.g., 2 in the case of FIG. 8) instead of 0, counting the predetermined minimum counter value of backoff slots with no medium activity of the channel of the link 1 can be performed after the timing 804, for determining the channel of the link being indeed clear, whereby the above false detection can be avoid.

Additionally, in the case that data to be transmitted or received have different QoS types (e.g., as shown in FIG. 4), the minimum counter value can be determined based on the QoS type. Exemplarily, the higher the priority of the QoS type, the smaller the predetermined minimum counter value. For example, for data of VO QoS type, the minimum counter value can be 1; and for data of BE QoS type, the minimum counter value can be 2. In this manner, the channel contention of the data of the QoS type with the high priority can be expedited.

In the present disclosure, in an embodiment, the second backoff counter can be a backoff counter with the smallest count value among the plurality of backoff counters. For example, there are three backoff counters 901-903 as show in FIG. 9, and the second backoff counter can be the backoff counter 902, which has the smallest count value among the three backoff counters 901-903. Alternatively, in another embodiment, the second backoff counter can be a backoff counter with the smallest count value among backoff counters associated with a subset of the plurality of the links. The links of the subset can be established by a first chip through which the first link is established. For example, assuming link 1 and link 2 in FIG. 1 are established by the first chip, but link 3 is established by a second chip. In this case, when the backoff counter of link 1 resumes counting after a pause, the counter value of the backoff counter of link 1 is synchronized with the counter value of the backoff counter of link 2 which is smaller than that of link 1, instead of the counter value of the backoff counter of link 3, even if the counter value of the backoff counter of link 3 is smaller than that of link 2. In this manner, the signal transmission among chips can be avoided, thereby reducing the signalling load within the device.

In the above disclosures, a backoff counting method in the NSTR operation mode has been described with reference to FIGS. 3-9, and in the following paragraphs, another backoff counting method in the NSTR operation mode according to an embodiment of the present disclosure will be described with referenced to FIGS. 10 and 11.

Figure 10:
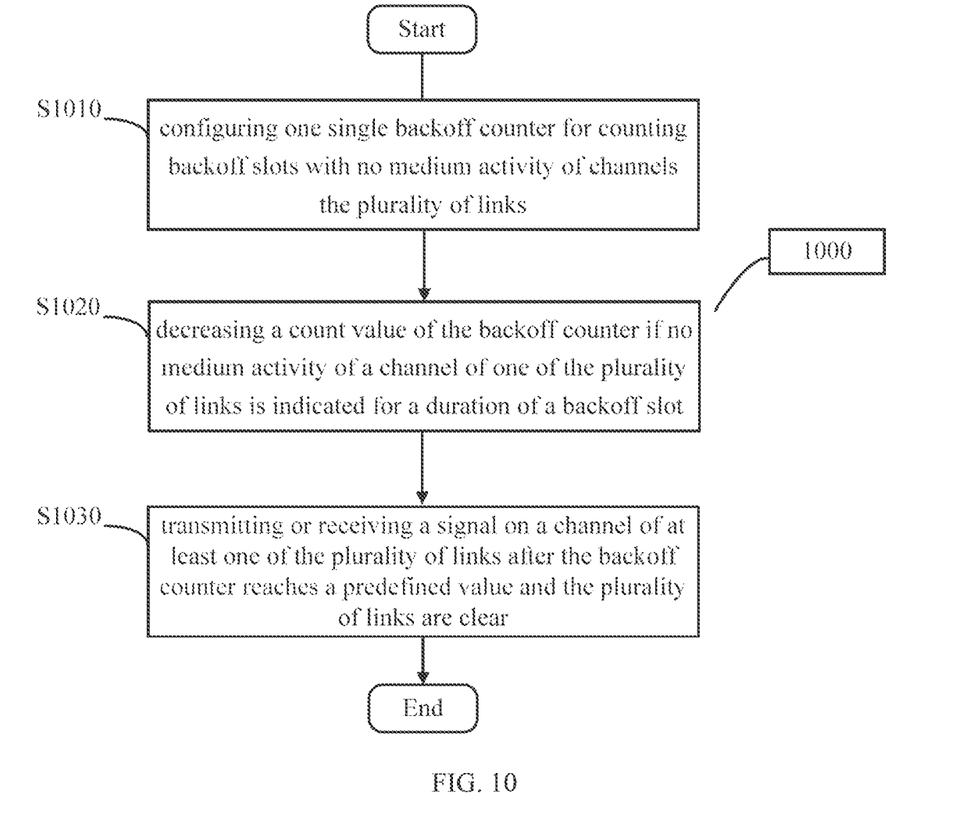
FIG. 10 shows another backoff counting method in the NSTR operation mode according to another embodiment of the present disclosure.

FIG. 10 shows another backoff counting method 1000 in the NSTR operation mode according to an embodiment of the present disclosure. Similarly, the backoff counting method 1000 in the NSTR operation mode shown in FIG. 10 can also be implemented in a communication device. The communication device can be configured with a plurality of links for communicating with another communication device. In an embodiment, the communication device can be an AP and the another communication device can be a STA. Alternatively, the communication device can be the STA and the another communication device can be the AP. Yet alternatively, the communication device can be the AP and the another communication device can also be the AP. Yet alternatively, the communication device can be the STA and the another communication device can also be the STA. The plurality of links can be three links operated in any one of 2.4 Ghz, 5 Ghz and 6 Ghz frequency bands.

As shown in FIG. 10, the backoff counting method 1000 starts at block 1010. At block 1010, one single backoff counter (e.g., a backoff counter 1101 in FIG. 11) is configured for counting backoff slots with no medium activity of channels for the plurality of links (e.g., link 1 and link 2 in FIG. 11). Then at block 1020, a count value of the backoff counter is decreased in response to a channel of one of the plurality of links is detected to be clear. For example, as shown in FIG. 11, the counter value of the backoff counter 1101 is keeping decreased from timing 1104-1107 in response to link 1 being clear, although link 2 is busy at this period. During a time period 1111, the backoff counter 1101 pauses its counting since both link 1 and link 2 are busy. That is, in the backoff counting method of FIG. 10, the single backoff counter for counting backoff slots with no medium activity of channels for the plurality of links pauses its counting only when all the plurality of links are busy. At block 1030, a signal is transmitted or received on a channel of at least one of the plurality of links after the backoff counter reaches a predefined value and the plurality of links are clear. Note, features described above with reference to FIGS. 3-9 can also be applied to the backoff counting method in the NSTR operation mode described with reference to FIG. 10 as long as these features do not contradict the method 1000. For example, data to be transmitted or received can have different QoS types, and in this case a first single backoff counter can be configured for data of a first type of QoS, and a second single backoff counter can be configured for data of a second type of QoS, and the like.

Figure 11:
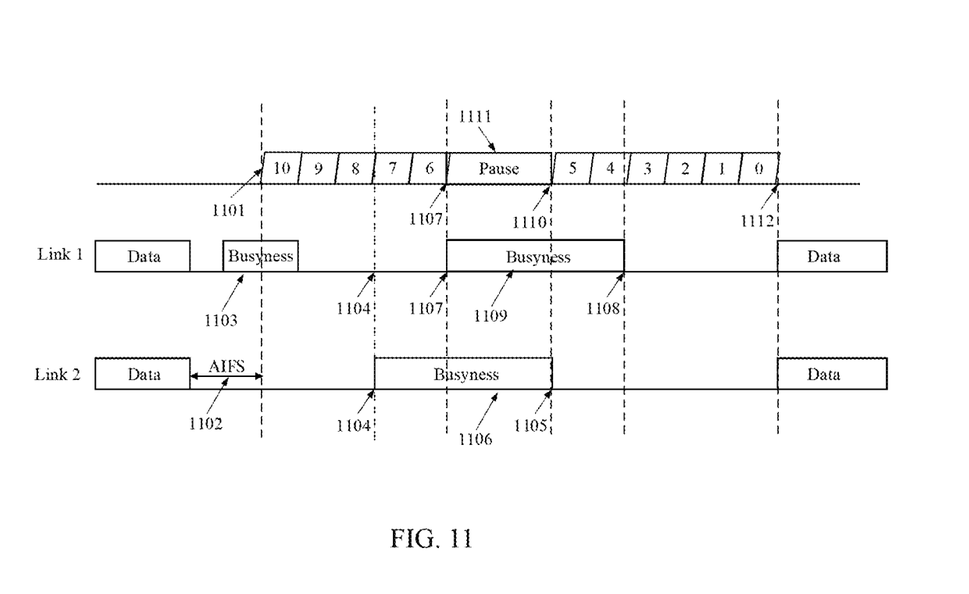
FIG. 11 is a schematic diagram for illustrating an exemplary scenario in which the another backoff counting method in the NSTR operation mode according to another embodiment of the present disclosure is applied.

In the backoff counting method in the NSTR operation mode described with referenced to FIGS. 10 and 11, the backoff waiting time between NSTR links due to the busyness of channels of the links being inconsistent can be reduced or eliminated, thereby facilitating the efficiency of the channel contention. This is because, the single backoff counter for counting backoff slots with no medium activity of channels for the plurality of links performs its backoff counting in response to any one of the plurality of links is clear.

In the above disclosures, the backoff counting methods (methods 300 and 1000) in the NSTR operation mode are described with reference to FIGS. 3-11. In the following paragraphs, a communication device according to an embodiment of the present disclosure is described with reference to FIGS. 12-14. In the present disclosure, the communication device (e.g., AP 101 or STA 102 in FIG. 1) can be configured with a plurality of links for communicating with another communication device (e.g., AP 101 or STA 102 in FIG. 1) and can perform the above methods (e.g., methods 300 and 1000) described with reference to FIGS. 3-11.

Figure 12:
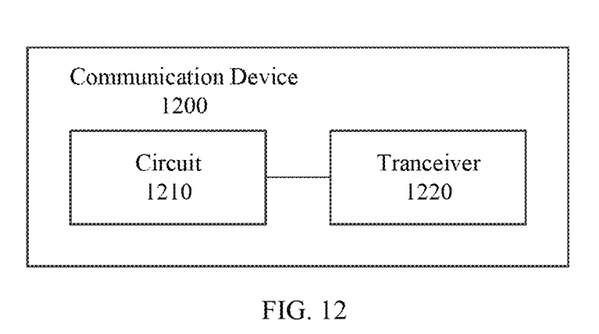
FIG. 12 is a schematic diagram of a communication device according to an embodiment of the present disclosure.

As shown in FIG. 12, the communication device 1200 comprises a circuit 1210 and a transceiver 1220. Exemplarily, the circuit 1210 can be configured to configure a plurality of backoff counters for counting backoff slots with no medium activity of channels of the plurality of links and synchronize a count value of a first backoff counter of the plurality of backoff counters with a count value of a second backoff counter of the plurality of backoff counters, if the first backoff counter starts counting later than the second backoff counter or resumes counting after a pause. The count value of the second backoff counter is smaller than that of the first backoff counter. The transceiver can be configured to transmit or receive a signal on a channel of at least one of the plurality of links after all the backoff counters reach a predefined value. The transceiver 1220 can be communicatively coupled with the circuit 1210. The transceiver 1220 can comprise separate transmitter and receiver or a single transceiver in which the transmitter and the receiver are integrated.

Figure 13:
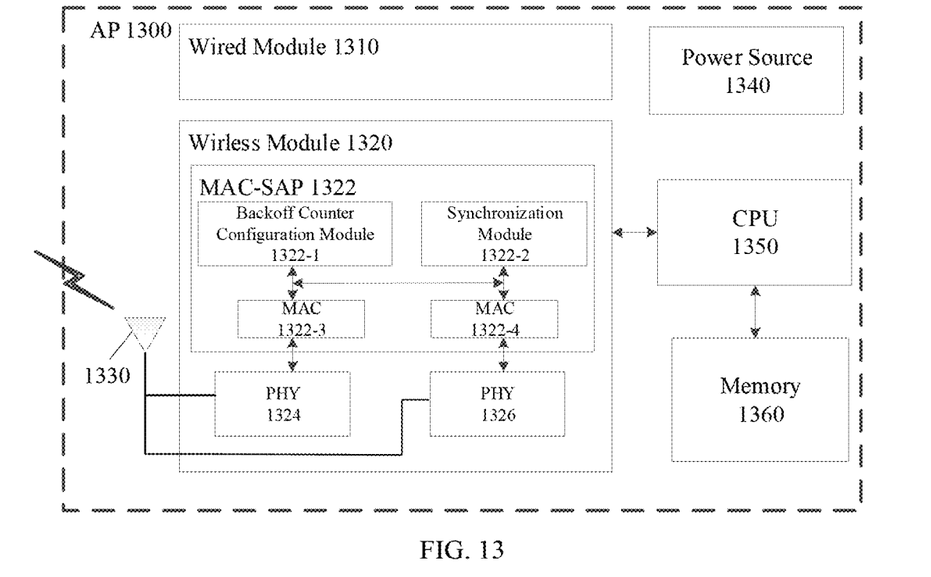
FIG. 13 shows an example configuration of a communication device, for example an AP, according to an embodiment of the present disclosure.

Further, FIG. 13 shows an example configuration of a communication device 1300, for example an AP, according to an embodiment of the present disclosure. The communication device 1300 may include a Wired module 1310, a Wireless module 1320, at least one antenna 1330 (for the sake of simplicity, only one antenna is shown in FIG. 13), a power source 1340, a central processing unit (CPU) 1350 and at least one memory 1360. The Wireless module 1320 may further comprise a MAC-SAP (service access point) 1322 (i.e., the MAC sublayer) and PHY 1324 and PHY 1326 (collectively referred to as the PHY sublayer). The MAC-SAP 1322 can comprise a backoff counter configuration module 1322-1, a synchronization module 1322-2, MAC 1322-3 and MAC 1322-4. The MAC 1322-3 and the PHY 1324 can constitute a AP entity (e.g., AP entity 1 in FIG. 1), which can be used to establish a link (e.g., link 1) and transmit/receive signal over a channel of the link via the antenna 1330, and similarly the MAC 1322-4 and the PHY 1326 can constitute anther AP entity (e.g., AP entity 2 in FIG. 1), which can be used to establish another link (e.g., link 2) and transmit/receive signal over a channel of another link via the antenna 1330. The backoff counter configuration module 1322-1 can be configured to configure a plurality of backoff counters for counting backoff slots with no medium activity of channels of the plurality of links (e.g., two links established by the MAC 1322-3 and the PHY 1324, and the MAC 1322-4 and the PHY 1326, respectively), and other related operations as described above. The synchronization module 1322-2 can be configured to synchronize a count value of a first backoff counter of the plurality of backoff counters with a count value of a second backoff counter of the plurality of backoff counters, if the first backoff counter starts counting later than the second backoff counter or resumes counting after a pause, wherein the count value of the second backoff counter is smaller than that of the first backoff counter, and other related operations as described above. The Wireless module 1320 and the CPU 1350 may function together as a circuit (e.g., a circuit 1210 in FIG. 12) of the communication device 1300 configured to perform methods (e.g., methods 300 and 1000) as described in the present disclosure. It should be understood that although FIG. 13 shows the MAC-SAP comprises two MACs, more than two MACs can be comprised in the MAC-SAP. The configuration of the communication device (e.g., AP) shown in FIG. 13 is merely as example, but not a limitation. The configuration of the communication device (e.g., AP) in the present disclosure can comprise more or less components than those in FIG. 13.

Figure 14:
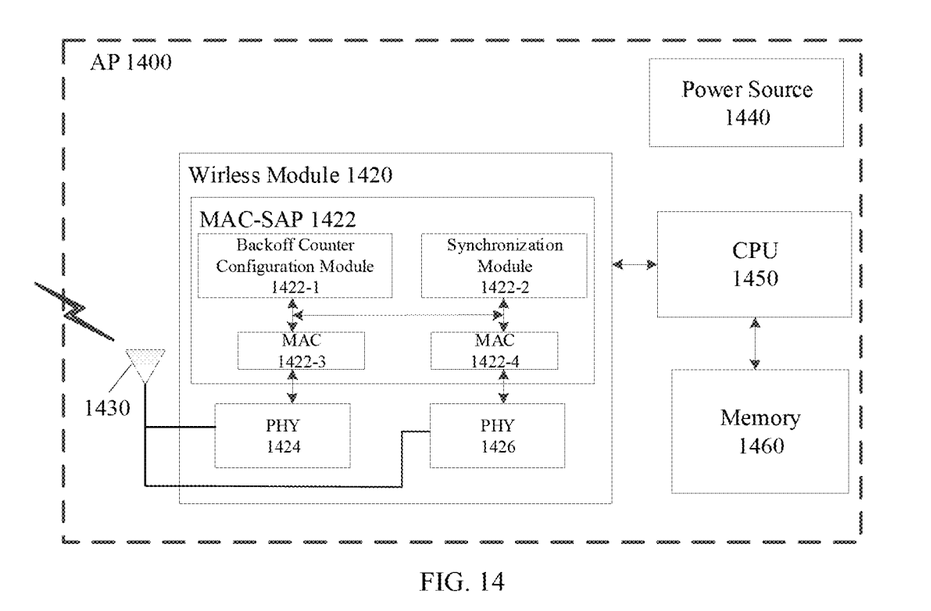
FIG. 14 shows an example configuration of a communication device, for example a non-AP or a STA, according to an embodiment of the present disclosure.

FIG. 14 shows an example configuration of a communication device 1400, for example a STA, according to an embodiment of the present disclosure. The communication device 1400 may include a Wireless module 1420, at least one antenna 1430 (for the sake of simplicity, only one antenna is shown in FIG. 14), a power source 1440, a central processing unit (CPU) 1450 and at least one memory 1460. The Wireless module 1420 may further comprise a MAC-SAP 1422 (i.e., the MAC sublayer) and PHY 1424 and PHY 1426 (collectively referred to as the PHY sublayer). The MAC-SAP 1422 can comprise a backoff counter configuration module 1422-1, a synchronization module 1422-2, MAC 1422-3 and MAC 1422-4. The MAC 1422-3 and the PHY 1424 can constitute a STA entity (e.g., STA entity 1 in FIG. 1), which can be used to establish a link (e.g., link 1) and transmit/receive signal over a channel of the link via the antenna 1430, and similarly the MAC 1422-4 and the PHY 1426 can constitute anther STA entity (e.g., STA entity 2 in FIG. 1), which can be used to establish another link (e.g., link 2) and transmit/receive signal over a channel of another link via the antenna 1430. The backoff counter configuration module 1422-1 can be configured to configure a plurality of backoff counters for counting backoff slots with no medium activity of channels of the plurality of links (e.g., two links established by the MAC 1422-3 and the PHY 1424, and the MAC 1422-4 and the PHY 1426, respectively), and other related operations as described above. The synchronization module 1422-2 can be configured to synchronize a count value of a first backoff counter of the plurality of backoff counters with a count value of a second backoff counter of the plurality of backoff counters, if the first backoff counter starts counting later than the second backoff counter or resumes counting after a pause, wherein the count value of the second backoff counter is smaller than that of the first backoff counter, and other related operations as described above. The Wireless module 1420 and the CPU 1450 may function together as a circuit (e.g., a circuit 1210 in FIG. 12) of the communication device 1400 configured to perform methods (e.g., methods 300 and 1000) as described in the present disclosure. Similar to FIG. 13, it should be understood that although FIG. 14 shows the MAC-SAP comprises two MACs, more than two MACs can be comprised in the MAC-SAP. The configuration of the communication device (e.g., STA) shown in FIG. 14 is merely as example, but not a limitation. The configuration of the communication device (e.g., STA) in the present disclosure can comprise more or less components than those in FIG. 14.

In addition, the present disclosure further provides a communication apparatus comprising means for processes of the methods (e.g., the methods 300 and 1000) in the NSTR operation mode according to any embodiment of the present disclosure.

In addition, the present disclosure further provides a computer-readable storage medium storing a computer program thereon which, when being executed by a processor, implements the backoff counting methods (e.g., the methods 300 and 1000) in the NSTR operation mode according to any embodiment of the present disclosure.

So far, the present disclosure has disclosed the backoff counting method in the NSTR operation mode, the communication device, the communication apparatus and the computer-readable storage medium for the method. The provided method, the communication device and the communication apparatus can reduce or eliminate the backoff waiting time between NSTR links due to the busyness of channels of the links being inconsistent, thereby facilitating the efficiency of the channel contention.

It should be noted that the above description is only some embodiments of the present disclosure and an illustration of the applied technical principles. It should be understood by those skilled in the art that the present disclosure scope involved in the present disclosure is not limited to the technical solutions resulted from specific combinations of the above technical features, but also encompasses other technical solutions resulted from any combination of the above technical features or their equivalents without departing from the above disclosed concept, for example, the technical solutions formed by replacing between the above features and the technical features with similar functions disclosed in the present disclosure (but not limited thereto).

In addition, although the operations are depicted in a specific order, this should not be understood as requiring these operations to be performed in the specific order shown or in a sequential order. In certain circumstances, multitasking and parallel processing may be beneficial. Likewise, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in multiple embodiments alone or in any suitable sub-combination.

Although the subject matter has been described in a language specific to structural features and/or logical acts of methods, it should be understood that the subject matter defined in the appended claims is not necessarily limited to the specific features or acts described above. On the contrary, the specific features and actions described above are merely example forms of implementing the claims.

What is claimed is:

1. A backoff counting method in a non-simultaneous transmit and receive (NSTR) operation mode implemented in a first communication device, the first communication device being configured with a plurality of links for communicating with a second communication device, the method comprising:
configuring a plurality of backoff counters for counting backoff slots with no medium activity of channels of the plurality of links;
synchronizing a count value of a first backoff counter of the plurality of backoff counters with a count value of a second backoff counter of the plurality of backoff counters, if the first backoff counter starts counting later than the second backoff counter or resumes counting after a pause, wherein the count value of the second backoff counter is smaller than that of the first backoff counter; and
transmitting or receiving a signal on a channel of at least one of the plurality of links after all the backoff counters reach a predefined value,
wherein the second backoff counter pauses counting during the pause of the first backoff counter, the synchronizing the count value of the first backoff counter of the plurality of backoff counters with the count value of the second backoff counter of the plurality of backoff counters comprising:
recording the counter value of the second backoff counter at the start of its pause; and
synchronizing the count value of the first backoff counter by synchronizing the count value of the first backoff counter with the recorded count value if the pause of the second backoff counter does not end when the first backoff counter resumes counting.

2. The method of claim 1, wherein the plurality of the links are operated in any one of 2.4 Ghz, 5 Ghz and 6 Ghz frequency bands.

3. The method of claim 1, wherein synchronizing the count value of the first backoff counter with the count value of the second backoff counter comprises setting the count value of the first backoff counter equal to the count value of the second backoff counter.

4. The method of claim 1, wherein the second backoff counter is a backoff counter with the smallest count value among the plurality of backoff counters, or
wherein the second backoff counter is a backoff counter with the smallest count value among backoff counters associated with a subset of the plurality of the links, and wherein the links of the subset are established by a first chip through which a first link associated with the first backoff counter is established.

5. The method of claim 1, wherein initial count values of the plurality of backoff counters are the same in a case that the plurality of backoff counters start counting simultaneously.

6. The method of claim 1, wherein the plurality of links are configured with a same waiting time from a timing at which the link completes a last transmission or reception until they start counting.

7. The method of claim 1, wherein the count value of the second backoff counter reaches and remains at zero, and a second link associated with the second backoff counter occupies a transmission opportunity (TXOP), and wherein transmitting or receiving the signal comprises transmitting or receiving the signal in the TXOP.

8. The method of claim 1, wherein the first backoff counter pauses counting if a channel of a first link associated with the first backoff counter is determined to be busy during a backoff slot, and wherein the busyness is caused by at least one of:
a data transmission on the channel of the first link;
an interference caused by a data transmission of a third communication device on a channel which is operated in the same frequency as the channel of the first link; or
an in-device coexistence (IDC) interference caused by a data transmission on a channel of a third link, wherein the third link and the first link belong to the same NSTR link pair, and the third link and a second link associated with the second backoff counter do not belong to the same NSTR link pair.

9. The method of claim 1, wherein in a case that multiple data which respectively correspond to multiple quality of service (QOS) types contend a transmission opportunity (TXOP) simultaneously, a plurality of backoff counters are configured for each of the multiple data, and wherein backoff procedures of the plurality of backoff counters corresponding to the multiple data are independent of each other.

10. The method of claim 1, wherein synchronizing the count value of the first backoff counter with the count value of the second backoff counter comprises setting the count value of the first backoff counter to a count value determined based on the count value of the second backoff counter.

11. A first communication device for backoff counting in a non-simultaneous transmit and receive (NSTR) operation mode, the first communication device being configured with a plurality of links for communicating with a second communication device, the first communication device comprising:
a circuit, configured to:
configure a plurality of backoff counters for counting backoff slots with no medium activity of channels of the plurality of links;
synchronize a count value of a first backoff counter of the plurality of backoff counters with a count value of a second backoff counter of the plurality of backoff counters, if the first backoff counter starts counting later than the second backoff counter or resumes counting after a pause, wherein the count value of the second backoff counter is smaller than that of the first backoff counter; and
a transceiver, configured to:
perform one or more data transmissions on a channel of at least one of the plurality of links after all the backoff counters reach a predefined value,
wherein the second backoff counter pauses counting during the pause of the first backoff counter, to synchronize the count value of the first backoff counter of the plurality of backoff counters with the count value of the second backoff counter of the plurality of backoff counters, the circuit, configured to:
record the counter value of the second backoff counter at the start of its pause; and
synchronize the count value of the first backoff counter by synchronizing the count value of the first backoff counter with the recorded count value if the pause of the second backoff counter does not end when the first backoff counter resumes counting.

12. The first communication device of claim 11, wherein the plurality of the links are operated in any one of 2.4 Ghz, 5 Ghz and 6 Ghz frequency bands.

13. The first communication device of claim 11, synchronizing the count value of the first backoff counter with the count value of the second backoff counter comprises setting the count value of the first backoff counter equal to the count value of the second backoff counter.

14. The first communication device of claim 11, wherein the second backoff counter is a backoff counter with the smallest count value among the plurality of backoff counters, or
wherein the second backoff counter is a backoff counter with the smallest count value among backoff counters associated with a subset of the plurality of the links, and wherein the links of the subset are established by a first chip through which a first link associated with the first backoff counter is established.

15. The first communication device of claim 11, wherein initial count values of the plurality of backoff counters are the same in a case that the plurality of backoff counters start counting simultaneously.

16. The first communication device of claim 11, wherein the plurality of links are configured with a same waiting time from a timing at which the link completes a last transmission or reception until they start counting.

17. The first communication device of claim 11, wherein the count value of the second backoff counter reaches and remains at zero, and a second link associated with the second backoff counter occupies a transmission opportunity (TXOP), and wherein the transceiver is configured to transmit or receive the signal in the TXOP.

18. The first communication device of claim 11, wherein the first backoff counter pauses counting if a channel of a first link associated with the first backoff counter is determined to be busy during a backoff slot, and wherein the busyness is caused by at least one of:
a data transmission on the channel of the first link;
an interference caused by a data transmission of a third communication device on a channel which is operated in the same frequency as the channel of the first link; or
an in-device coexistence (IDC) interference caused by a data transmission on a channel of a third link, wherein the third link and the first link belong to the same NSTR link pair, and the third link and a second link associated with the second backoff counter do not belong to the same NSTR link pair.

19. The first communication device of claim 11, wherein the first communication device is an access point (AP) and the second communication device is a station (STA), wherein the first communication device is the STA and the second communication device is the AP, wherein the first communication device is the AP and the second communication device is the AP or wherein the first communication device is the STA and the second communication device is the STA.

20. A backoff counting method in a non-simultaneous transmit and receive (NSTR) operation mode implemented in a first communication device, the first communication device being configured with a plurality of links for communicating with a second communication device, the method comprising:
configuring one single backoff counter for counting backoff slots with no medium activity of channels the plurality of links;
decreasing a count value of the backoff counter if no medium activity of a channel of one of the plurality of links is indicated for a duration of a backoff slot;
transmitting or receiving a signal on a channel of at least one of the plurality of links after the backoff counter reaches a predefined value and the plurality of links are clear.

* * * * *